(12) United States Patent
Miglioranza

(10) Patent No.: US 8,217,627 B2
(45) Date of Patent: Jul. 10, 2012

(54) SYSTEM AND METHOD FOR MANAGING POWER TO AN ELECTRONIC APPARATUS ON-BOARD A BICYCLE

(75) Inventor: Federico Miglioranza, Schio (IT)

(73) Assignee: Campagnolo S.r.l., Vicenza (IT)

( * ) Notice: Subject to any disclaimer, the term of this patent is extended or adjusted under 35 U.S.C. 154(b) by 1076 days.

(21) Appl. No.: 12/060,376

(22) Filed: Apr. 1, 2008

(65) Prior Publication Data

US 2008/0252297 A1 Oct. 16, 2008

(30) Foreign Application Priority Data

Apr. 12, 2007 (IT) .............................. MI2007A0737

(51) Int. Cl.
*H01M 10/44* (2006.01)
*H01M 10/46* (2006.01)
(52) U.S. Cl. ...................................................... 320/132
(58) Field of Classification Search ................ 320/107, 320/14, 112, 114, 115, 132, 149, 104
See application file for complete search history.

(56) References Cited

U.S. PATENT DOCUMENTS

| | | | |
|---|---|---|---|
| 5,236,759 A | 8/1993 | Sakurai | |
| 5,370,412 A | 12/1994 | Chou | |
| 5,889,463 A | 3/1999 | Judd et al. | |
| 5,971,116 A | 10/1999 | Franklin | |
| 6,192,300 B1 | 2/2001 | Watarai et al. | |
| 6,204,752 B1 | 3/2001 | Kishimoto | |
| 6,253,980 B1 * | 7/2001 | Murakami et al. | 224/510 |
| 6,281,674 B1 | 8/2001 | Huang | |
| 6,682,087 B1 | 1/2004 | Takeda | |
| 6,757,567 B2 | 6/2004 | Campagnolo et al. | |
| 6,786,866 B2 | 9/2004 | Odagiri et al. | |
| 6,844,845 B1 | 1/2005 | Whiteside et al. | |
| 6,903,652 B2 | 6/2005 | Noguchi et al. | |
| 6,941,197 B1 * | 9/2005 | Murakami et al. | 320/109 |
| 7,089,100 B2 | 8/2006 | Takeda et al. | |
| 7,132,931 B2 | 11/2006 | Okada | |
| 7,408,447 B2 | 8/2008 | Watson | |
| 7,495,549 B2 | 2/2009 | Acres | |
| 2001/0004913 A1 | 6/2001 | Maeda et al. | |
| 2003/0207731 A1 | 11/2003 | Oohara | |
| 2004/0000990 A1 | 1/2004 | Takeda et al. | |
| 2004/0089092 A1 | 5/2004 | Campagnolo | |
| 2004/0239489 A1 | 12/2004 | Takeda | |

(Continued)

FOREIGN PATENT DOCUMENTS

CN 1192033 9/1998

(Continued)

OTHER PUBLICATIONS

Chinese Office Acton, Appl. No. 200810004457.4, dated Jul. 14, 2011

(Continued)

*Primary Examiner* — Edward Tso
(74) *Attorney, Agent, or Firm* — Volpe and Koenig, P.C.

(57) ABSTRACT

In order to allow the cyclist to keep the state of the batteries under control during use of a bicycle equipped with an on-board electronic apparatus or during the recharging of the batteries, data is displayed to the cyclist relative to the batteries on the display device of the on-board electronic apparatus.

24 Claims, 11 Drawing Sheets

U.S. PATENT DOCUMENTS

| | | | |
|---|---|---|---|
| 2005/0008992 A1 | 1/2005 | Westergaard et al. | |
| 2005/0195094 A1 | 9/2005 | White | |
| 2007/0179632 A1* | 8/2007 | Campagnolo et al. | 700/2 |
| 2007/0179635 A1 | 8/2007 | Bailey et al. | |
| 2008/0180233 A1 | 7/2008 | Miglioranza | |
| 2008/0252297 A1 | 10/2008 | Miglioranza | |
| 2008/0312799 A1 | 12/2008 | Miglioranza | |
| 2009/0170660 A1 | 7/2009 | Miglioranza | |

FOREIGN PATENT DOCUMENTS

| | | |
|---|---|---|
| CN | 1301622 | 7/2001 |
| DE | 19640248 | 10/1997 |
| DE | 19640248 A1 | 10/1997 |
| DE | 202004003150 | 7/2004 |
| DE | 102006019385 | 10/2007 |
| EP | 0794113 | 9/1997 |
| EP | 0794113 A | 9/1997 |
| EP | 0846614 | 6/1998 |
| EP | 0846614 A | 6/1998 |
| EP | 1050944 | 11/2000 |
| EP | 1050944 A | 11/2000 |
| EP | 1295785 | 3/2003 |
| EP | 1295785 A | 3/2003 |
| EP | 1298050 | 4/2003 |
| EP | 1298050 A1 | 4/2003 |
| EP | 1340673 | 9/2003 |
| EP | 1452431 | 9/2004 |
| EP | 1463013 | 9/2004 |
| EP | 1463013 A | 9/2004 |
| EP | 1557926 | 7/2005 |
| EP | 1557926 A1 | 7/2005 |
| EP | 1500582 | 12/2005 |
| EP | 1630095 | 3/2006 |
| GB | 2152247 | 7/1985 |
| GB | 2152247 A | 7/1985 |
| JP | 10199374 | 7/1998 |
| JP | 2002260492 | 9/2002 |
| JP | 2002271047 | 9/2002 |
| WO | 0100281 | 1/2001 |
| WO | 2004087490 | 10/2004 |
| WO | 2005041234 | 5/2005 |
| WO | 2007075734 | 7/2007 |

OTHER PUBLICATIONS

Chinese Office Acton, Appl. No. 200810004457.4, dated Jul. 14, 2011.

European Search Report, Appl. No. EP 08005436, dated Jan. 30, 2009.

European Search Report, Appl. No. EP 08005414.1-2421, dated Apr. 6, 2009.

* cited by examiner

SYSTEM AND METHOD FOR MANAGING POWER TO AN ELECTRONIC APPARATUS ON-BOARD A BICYCLE

FIELD OF INVENTION

The field of the invention is an electronic apparatus mountable on board of a bicycle, a system comprising it, as well as a method for managing it, and a method for displaying data relative to a battery power supply unit thereof.

BACKGROUND

Electronic systems for bicycles also known as cyclecomputers provide for a display device mountable on the bicycle, for example a liquid crystal display (LCD) to display travel data, like for example current speed, average speed, cadence, travel time, heart rate etc., detected by suitable sensors and/or calculated by a processor. The bicycle electronic systems can also provide for controlling an electromechanical gearshift. In order to select the data displayed and/or to manually change the speed ratio, bicycle electronic systems comprise input means such as levers and/or buttons.

Such bicycle electronic systems provide for use of a power supply unit for the display device and for the electronics, normally consisting of one or more batteries. The batteries used in such systems can be of the disposable type or of the rechargeable type, in the latter case the possibility of accessing the terminals of the batteries being provided, to allow them to be recharged through a battery-charger, possibly removing them from the bicycle.

SUMMARY

The invention concerns an on-board electronic apparatus for a bicycle comprises a display device and a battery power supply unit, characterized by further comprising electronics for obtaining at least one datum relative to the battery power supply unit and for displaying the at least one datum on the display device.

The invention also concerns a method for managing an on-board electronic apparatus for a bicycle comprising a display device and a battery power supply unit, comprising the steps of obtaining at least one datum relative to the battery power supply unit, and displaying the at least one datum on the display device.

The invention also concerns a method for displaying data relative to a battery power supply unit of an on-board electronic apparatus for a bicycle, comprising the steps of:

obtaining a charge consumption of the battery power supply unit per unit traveled distance, detecting a remaining charge of the battery power supply unit, calculating an available remaining distance as a ratio between the remaining charge and the charge consumption per unit traveled distance, and displaying the available remaining distance.

BRIEF DESCRIPTION OF THE DRAWINGS

The invention shall now be better described with reference to some embodiments thereof, illustrated purely as non-limiting examples in the attached drawings.

DETAILED DESCRIPTION OF THE PREFERRED EMBODIMENTS INTRODUCTION

Figure 1:
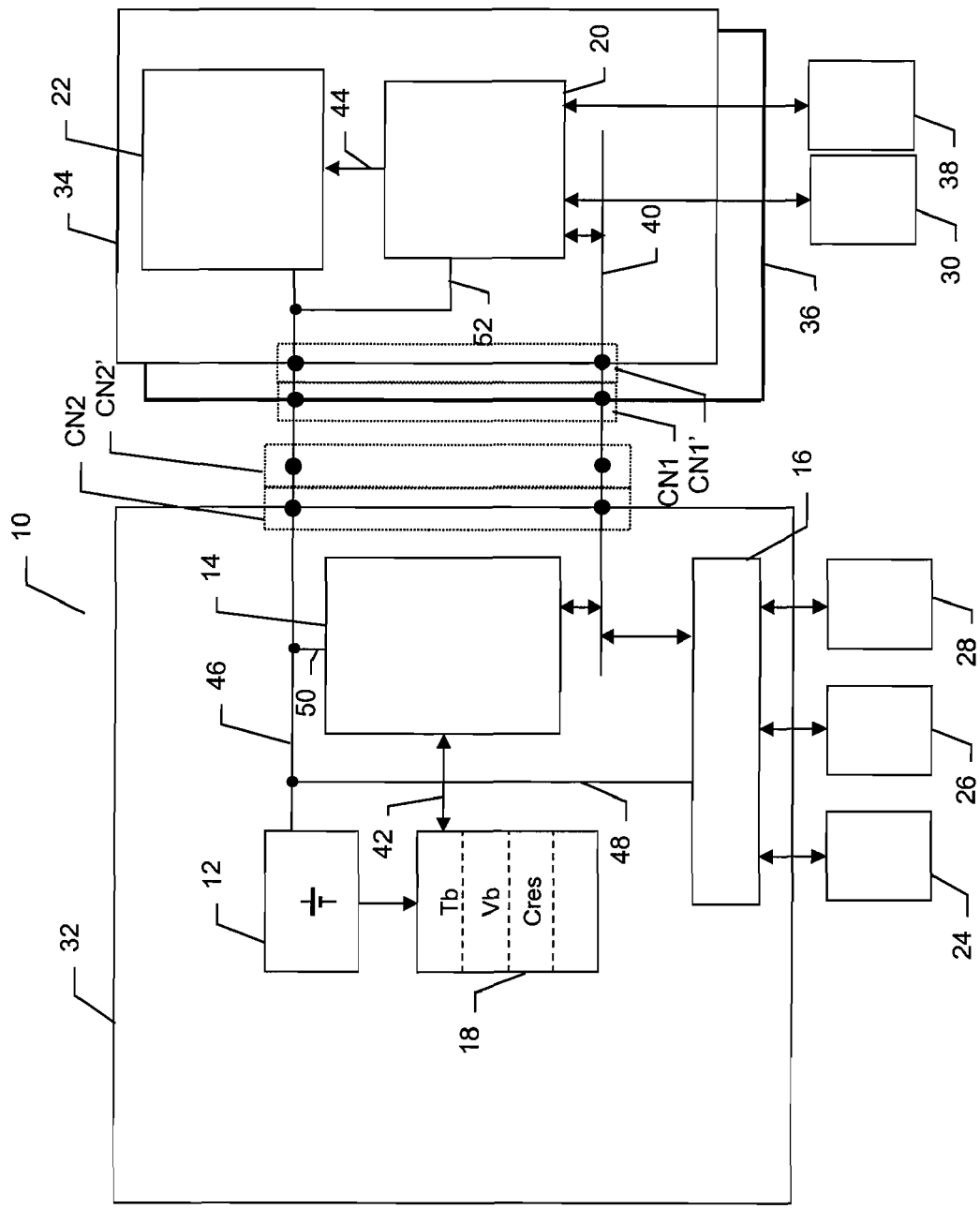
FIG. 1 diagrammatically shows an on-board electronic apparatus for a bicycle.

The on-board electronic apparatus for a bicycle comprises a display device and a battery power supply unit, and further, electronics for obtaining at least one datum relative to the battery power supply unit and for displaying the at least one datum on the display device.

The electronics may comprise plural components connected in a network for data communication.

The electronic components may communicate through a half duplex asynchronous serial communication protocol through a data line.

The battery power supply unit of the on-board electronic apparatus can be of the rechargeable type. The recharging of the battery power supply unit can take place by removing it from the on-board electronic apparatus and inserting it in a suitable battery-charger.

Alternatively, the recharging of the battery power supply unit can take place without removing it from the on-board electronic apparatus, through a suitable battery-charger that is part of or preferably removably associable with the on-board electronic apparatus.

Such an on-board electronic apparatus and associated battery-charger form an electronic system for a bicycle according to another aspect of the invention.

The battery-charger of the electronic system for a bicycle may have no display device, the data relative to the battery power supply unit being displayed on the display device of the on-board electronic apparatus.

In this way, the battery-charger is particularly simple and cost-effective.

A method for managing an on-board electronic apparatus for a bicycle comprising a display device and a battery power supply unit, performs the steps of obtaining at least one datum relative to the battery power supply unit, and displaying the at least one datum on the display device.

The method may further comprise the step of recharging the battery power supply unit, and the step of obtaining at least one datum is carried out at least in part during the recharging step.

The step of obtaining at least one datum relative to the battery power supply unit may be carried out at predetermined recurrence when the on-board electronic apparatus is in an active condition. The predetermined recurrence is selected so as to satisfy the opposing requirements of obtaining data that is as up-to-date as possible on the one hand, and of not busying too much the electronics of the apparatus and in particular on a data communication network thereof on the other.

Moreover, the step of obtaining at least one datum relative to the battery power supply unit may be carried out at predetermined recurrence when the on-board electronic apparatus is in a stand-by condition, in order to monitor slowly variable quantities.

The at least one datum relative to the battery power supply unit may be selected from the group consisting of a temperature, a voltage at the terminals, a remaining charge, an alarm state, a recharge state, and a remaining autonomy of the battery power supply unit.

The method may further comprise the step of displaying information other than the at least one datum relative to the battery power supply unit on the display device, for example travel parameters such as current speed, average speed, cadence, travel time, heart rate etc.

The method may comprise a step of manually selecting the information to be displayed.

When the at least one datum relative to the battery power supply unit comprises an alarm state or a recharge state of the battery power supply unit, the method may comprise a step of forcing the display of the at least one datum relative to the battery power supply unit.

A method for displaying data relative to a battery power supply unit of an on-board electronic apparatus for a bicycle, comprises the steps of:

obtaining a charge consumption of the battery power supply unit per unit traveled distance, detecting a remaining charge of the battery power supply unit, calculating an available remaining distance as a ratio between the remaining charge and the consumption of charge per unit traveled distance, and displaying the available remaining distance.

The step of obtaining a charge consumption per unit traveled distance may comprise the steps of:

obtaining a consumed charge, obtaining a traveled distance, calculating the charge consumption per unit traveled distance as a ratio between the consumed charge and the traveled distance.

The method further may comprise the steps of:

obtaining an average speed, calculating an available remaining time as a ratio between the available remaining distance and the average speed, and displaying the available remaining time.

Preferably, the method further comprises the steps of:

detecting a travel time, calculating a number of available remaining days as a ratio between the available remaining time and the travel time, and displaying the number of available remaining days.

In an embodiment, the charge consumption per unit traveled distance, average speed and/or travel time are daily averages.

In another embodiment, the charge consumption per unit traveled distance, average speed and/or average travel time are values averaged over a predetermined number of days.

DETAILED DESCRIPTION

FIG. 1 diagrammatically shows an embodiment of an on-board electronic apparatus 10 for a bicycle.

The on-board electronic apparatus 10 carries out one or more functions among the detection of travel parameters such as speed, pedaling cadence, heart rate of the cyclist and similar to be displayed for the cyclist's information; the control of an electromechanical gearshift based on manually entered command signals; and the automatic control of an electromechanical gearshift based on the detected travel parameters.

To this purpose, the on-board electronic apparatus 10 generally comprises a battery power supply unit 12, processing/controlling electronics 14, 16, 18, 20, a display device 22, for example of the LCD type, and one or more peripheral devices, schematized by the blocks 24, 26, 28.

The peripheral devices 24, 26, 28 can comprise a speed sensor mounted in proximity to a wheel, a cadence sensor mounted in proximity to the bottom bracket, a heart rate sensor to be applied to the cyclist's body, one or two actuators associated with the derailleur(s) of a gearshift.

Manual command devices 30 for selecting the information displayed on the display device 22, and/or manual command devices 38 of the gearshift is/are provided in a position easily accessible for the cyclist's fingers. Manual command devices 30, 38 can also at least partially coincide and be managed in a context sensitive manner.

In the illustrated embodiment, the on-board electronic apparatus 10 comprises a first casing 32, suitable for being mounted for example at a bottle holder, and a second casing 34, suitable for being mounted in a position readily visible to the cyclist. The second casing 34 can be removably coupled with a support 36 fixedly mounted on the bicycle, through a pair of electromechanical connectors CN1, CN1', preferably of the snap type. The electrical data and power connection between the first casing 32 and the support 36—or between the first casing 32 and the second casing 34 in the absence of the support 36—is preferably made via cable and is preferably removable at a second pair of removable electrical connectors CN2, CN2', but alternatively it can be fixed.

The on-board electronic apparatus 10 could however comprise the second casing 34 only that can be mounted in a position readily visible to the cyclist, suitably connected with the peripheral devices 24, 26, 28 possibly through the support 36.

The electronics 14, 16, 18, 20 of the on-board electronic apparatus 10 may be distributed between the first and the second casing 32, 34.

In the illustrated embodiment, the electronics 20 housed in the second casing 34 are intended to drive the display device 22 also according to the commands entered through the manual command devices 30, and the electronics 14, 16, 18 housed in the first casing 32 comprises a processor 14, a power board 16 intended to communicate with the peripheral devices 24, 26, 28, and a monitoring circuit 18 of the battery power supply unit 12.

The components of the electronics 14, 16, 20 are connected together in a network through a first data line 40.

A second data line 42 is provided between the monitoring circuit 18 and the processor 14.

A third data line 44 is provided between the electronics 20 for controlling the display device 22 and the display device 22 itself.

The battery power supply unit 12 comprises one or more batteries for supplying a suitable supply voltage to the components of the on-board electronic apparatus 10. In FIG. 1 a single power supply line 46 is shown merely by way of an example—which in practice shall be of the two or three-wire type—coming out from the battery power supply unit 12, and shunts 48, 50, 52 from such a power supply line 46 to the various components of the on-board electronic apparatus 10.

The battery(ies) of the battery power supply unit 12 can be of a rechargeable type. In this case, recharging shall take place through a suitable battery-charger connected with the electrical mains, removing the battery power supply unit from the on-board electronic apparatus 10.

In case the on-board electronic apparatus 10 comprises the two casings 32, 34 and possibly the support 36 removably connected as shown, a second battery power supply unit (not shown), for example a button cell, could be provided in the second casing 34 or in the support 36 for supplying power to the display device 22 and to its driving electronics 20.

The monitoring circuit 18 of the battery power supply unit 12 is suitable for providing at least one datum relative to the battery power supply device 12, in particular the operating temperature Tb, the nominal voltage value Vb at the terminals, and/or the remaining charge value Cres.

Such data can be read by the monitoring circuit 18 through a predetermined protocol, for example one of the communication protocols known as SDQ, HDQ or I2C, through the data line 42.

The monitoring circuit 18 of the battery power supply unit 12 can for example be the integrated circuit bq2023 or the integrated circuit bq26500 from Texas Instruments, Inc., Dallas, Tex., U.S.A.

The monitoring circuit 18 provides the aforementioned data relative to the battery power supply unit 12 on the data line 42. The processor 14 provides for reading the data relative to the battery power supply unit 12 and sending it, through the driving electronics 20, to the display device 22 for information purposes for the cyclist.

A preferred way to communicate the data relative to the battery power supply unit 12 to the display device 22 is described hereinafter with reference to the block diagrams of FIGS. 2, 4 and 5.

Figure 2:
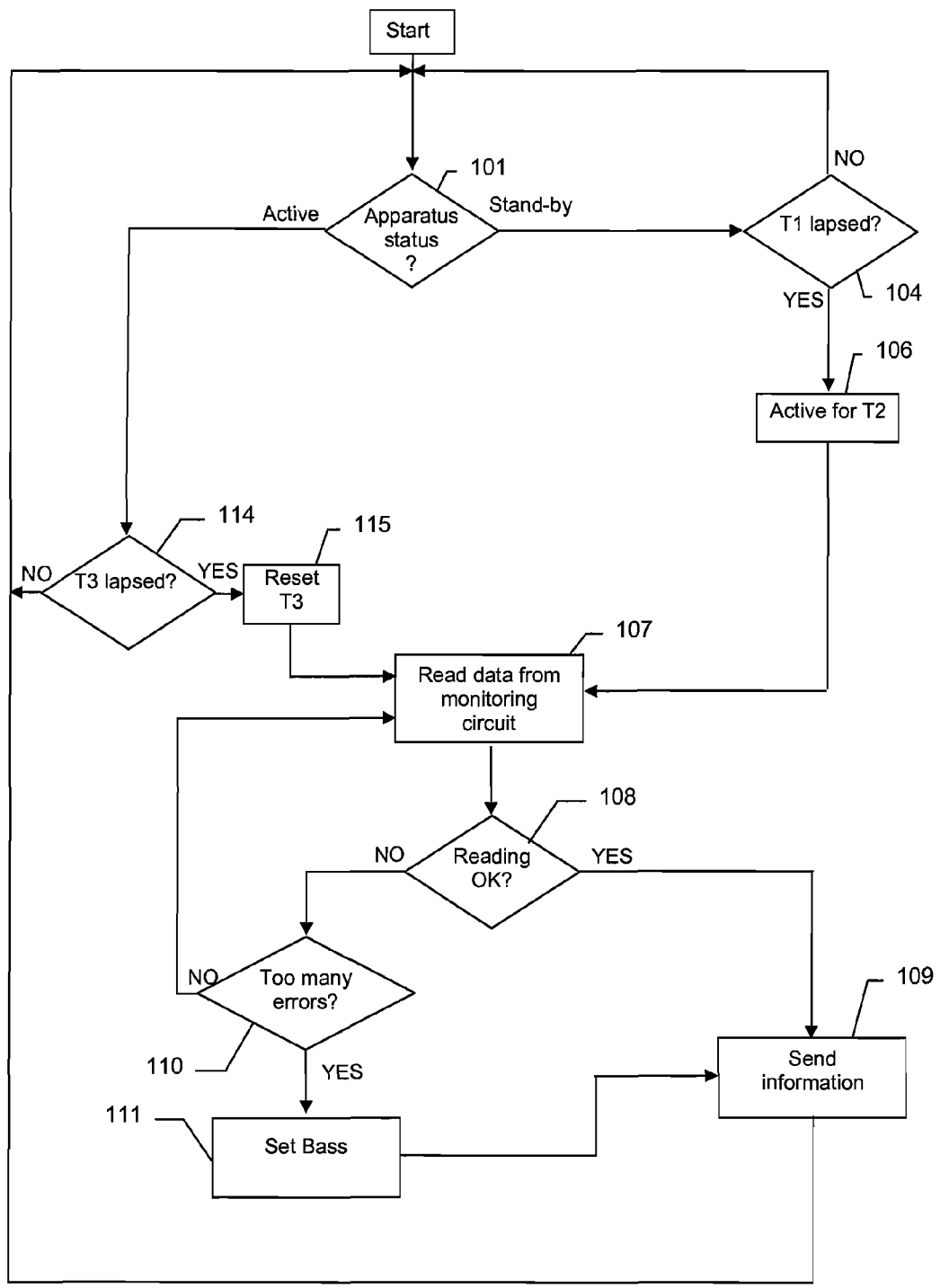
FIG. 2 shows a flow chart relative to the management of a component of the electronic apparatus of FIG. 1.

With reference to the flow chart of FIG. 2, relative to the processor 14 connected with the monitoring device 18, first a check is made in a block 101 whether the on-board electronic apparatus 10 is in a stand-by condition, this being the condition into which it goes for example when the bicycle is still for a long time, or in an active condition. The on-board electronic apparatus 10 is active when the bicycle moves or is commanded or in any case when its electronic part is used; moreover, it can be active for a minimum time after the activation of buttons, sensors, etc.; finally, as shall be seen, it can be active for a certain period of time when there are timed awakes necessary to monitor slowly variable quantities that should be taken into account even with the system in stand-by.

If the on-board electronic apparatus 10 is in the stand-by condition, in a block 104 the lapse of a first predetermined time period T1 is checked. If this first time period has not lapsed, starting block 101 is returned to, and the on-board electronic apparatus 10 remains in the stand-by condition.

The first time period T1, or refresh time, is selected to be relatively long, like a few hours, for example 5 hours. A timer dedicated to checking the first time period T1 is of course reset each time the on-board electronic apparatus 10 goes into stand-by condition.

If from the check of block 104 it is found that the first time period T1 has lapsed, the on-board electronic apparatus 10 is woken up to accomplish the monitoring of the slowly variable quantities, taking it in a block 106 into the active condition for a second predetermined time period T2.

The second time period T2 is selected of such a length as to allow the operations of displaying the data relative to the battery power supply unit 12. For example, the second time period can be 40 seconds.

As soon as the apparatus has been taken into active condition in block 106, in a block 107 the processor 14 carries out an attempt at reading the data Tb, Vb, and Cres relative to the battery power supply unit 12 from the monitoring circuit 18 through the data line 42.

In a block 108 it is checked whether the reading was successful. In the affirmative case, in a block 109 the processor 14 sends the data relative to the battery power supply unit 12, for example the data Tb, Vb and Cres, to the driving device 20 of the display device 22 through the data line 40.

Figure 3:
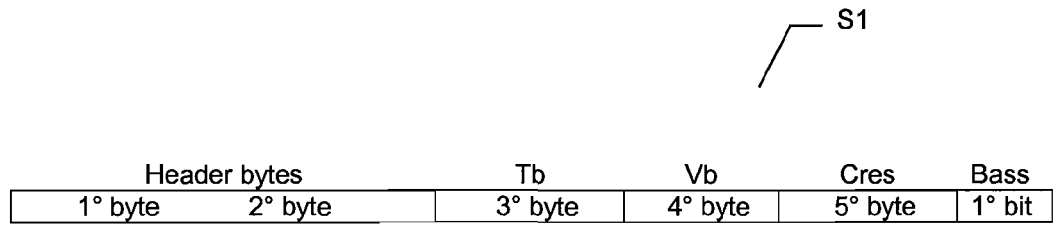
FIG. 3 shows an embodiment of a data structure used by the electronic apparatus of FIG. 1.

The data Tb, Vb and Cres relative to the battery power supply unit 12 are preferably transmitted to the driving device 20 of the display device 22 through the data line 40 in a data packet or string S1 having the structure shown in FIG. 3.

The string S1 comprises one or more, preferably two, header bytes, depending upon the communication protocol used. In this embodiment, the string S1 also comprises three bytes, each associated with one of the data Tb, Vb and Cres relative to the battery power supply unit 12. The string S1 finally comprises a bit indicative of a status flag Bass of the battery power supply unit 12, which, when the reading is successful as checked in block 108, is set at a value indicative of the "battery data present" status.

If, on the other hand, the reading has been unsuccessful as checked in block 108, in a block 110 it is checked whether the number of consecutive reading errors is greater than a predetermined threshold, for example ten.

In the negative case, a further reading attempt is carried out returning to block 107.

If, on the other hand, from the check of block 110 it is found that too many consecutive reading errors have taken place, in a block 111 the status flag Bass is set at a value indicative of the "battery data absent" status, and in block 109 the data string S1 is sent to the driving device 20 of the display device 22 through the data line 40, wherein the value of the bytes associated with the data Tb, Vb and Cres relative to the battery power supply unit 12 is not significant.

Returning to the start of the flow chart, if from the check of block 101 it is found that the on-board electronic apparatus 10 is active, in a block 114 the lapse of a third predetermined time period T3 is checked.

If such a third time period T3 has not lapsed, the starting block 101 returned to. If, on the other hand, the third time period T3 has lapsed, in a block 115 the third time period T3 is reset, and then block 107 of reading the data Tb, Vb and Cres relative to the battery power supply unit 12 is entered.

The third time period T3 is selected of a suitable length between the opposing requirements of having data Tb, Vb and Cres that is as up-to-date as possible on the one hand, and of not busying too much the data lines 40, 42 on the other. A suitable value for the third time period T3 is for example 20 seconds.

Figure 4:
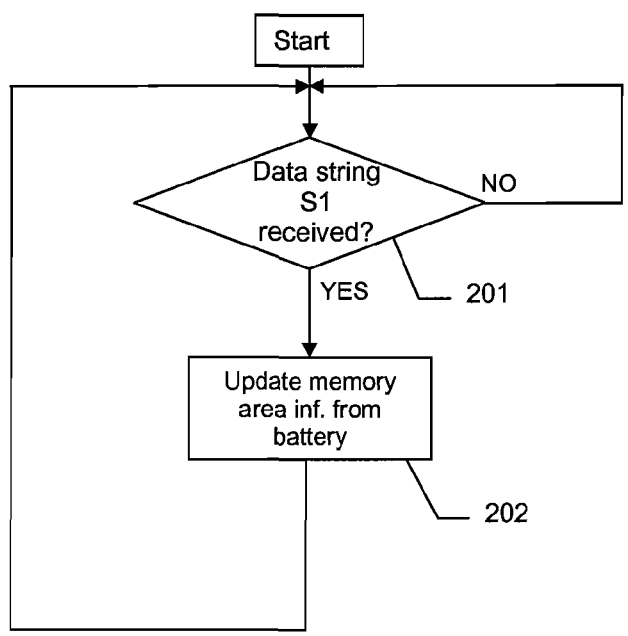
FIG. 4 shows a flow chart relative to a first management routine of a second component of the electronic apparatus of FIG. 1.
Figure 5:
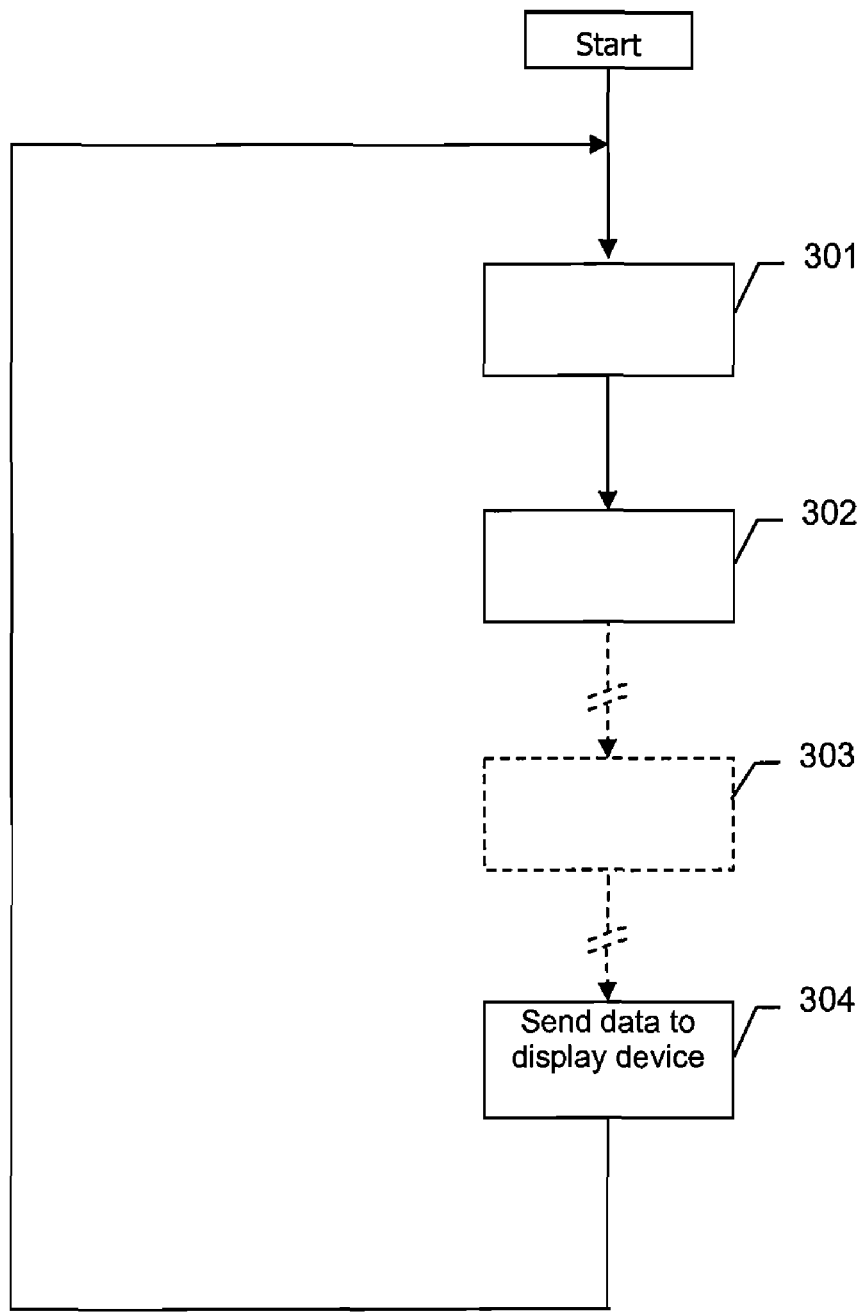
FIG. 5 shows a flow chart relative to a second management routine of the second component of the electronic apparatus of FIG. 1.

The block diagrams of FIGS. 4 and 5 are relative to the driving device 20 of the display device 22.

In a first routine, shown in FIG. 4, the driving device 20 checks in a block 201 whether it has received data relative to the battery power supply device 12 through the data line 40, in particular whether it has received the data string S1. The control block 201 continues to be executed until there is a positive outcome. In the case of a positive outcome, in a block 202 the driving device 20 updates a memory area in which the temperature Tb, voltage Vb, and remaining charge Cres data, or the status flag Bass, are stored.

In a second routine, shown in FIG. 5, the driving device 20 of the display device 22 cyclically carries out a series of activities, schematized by blocks 301, 302, 303, and 304, including for example monitoring the activation of the manual command devices 30, 38, checking the activity of the communication network etc., as well as managing the information to be displayed. In addition to the cyclic succession, the advancing between blocks 301-304 relative to the various activities of the driving device 20 can be forced by external events (interrupt).

During the activities schematized by blocks 301-303, in particular a memory register R1 (not shown) is set at a value representative of the page to be displayed among a series of predetermined pages. For example, pages can be predetermined for displaying travel parameters such as speed and pedaling cadence, heart rate, current transmission ratio, current time or the lapsed time or the traveled distance and similar, interface pages for setting the on-board electronic apparatus 10, and one or more pages for displaying data relative to the battery power supply unit 12.

The page to be displayed can for example be selected by the cyclist through the manual command devices 30, or be determined by the driving device 20 itself, for example for displaying error codes or malfunction alarms of the on-board electronic apparatus 10, in particular in case the string S1 contains the indication, through the status flag Bass, that the data relative to the battery power supply unit are unavailable.

In block 304, the data to be displayed in the current page indicated by the register R1 are sent to the display device 22. In particular, in case one or more data relative to the battery power supply unit 12 have to be displayed, the driving device 20 shall send the display device 22 the data that had been stored in the suitable memory area during the execution of block 202 of the routine shown in FIG. 4.

Similarly to what has been described above, the travel parameters such as speed and pedaling cadence, heart rate and similar, and the control signals of the gearshift detected by the manual command devices 38 or by the peripheral devices 24, 26, 28 or intended for the peripheral devices 24, 26, 28 are transmitted on the network made through the data line 40, again using the data packet S1 with a suitable value of the header bytes.

Figure 6:
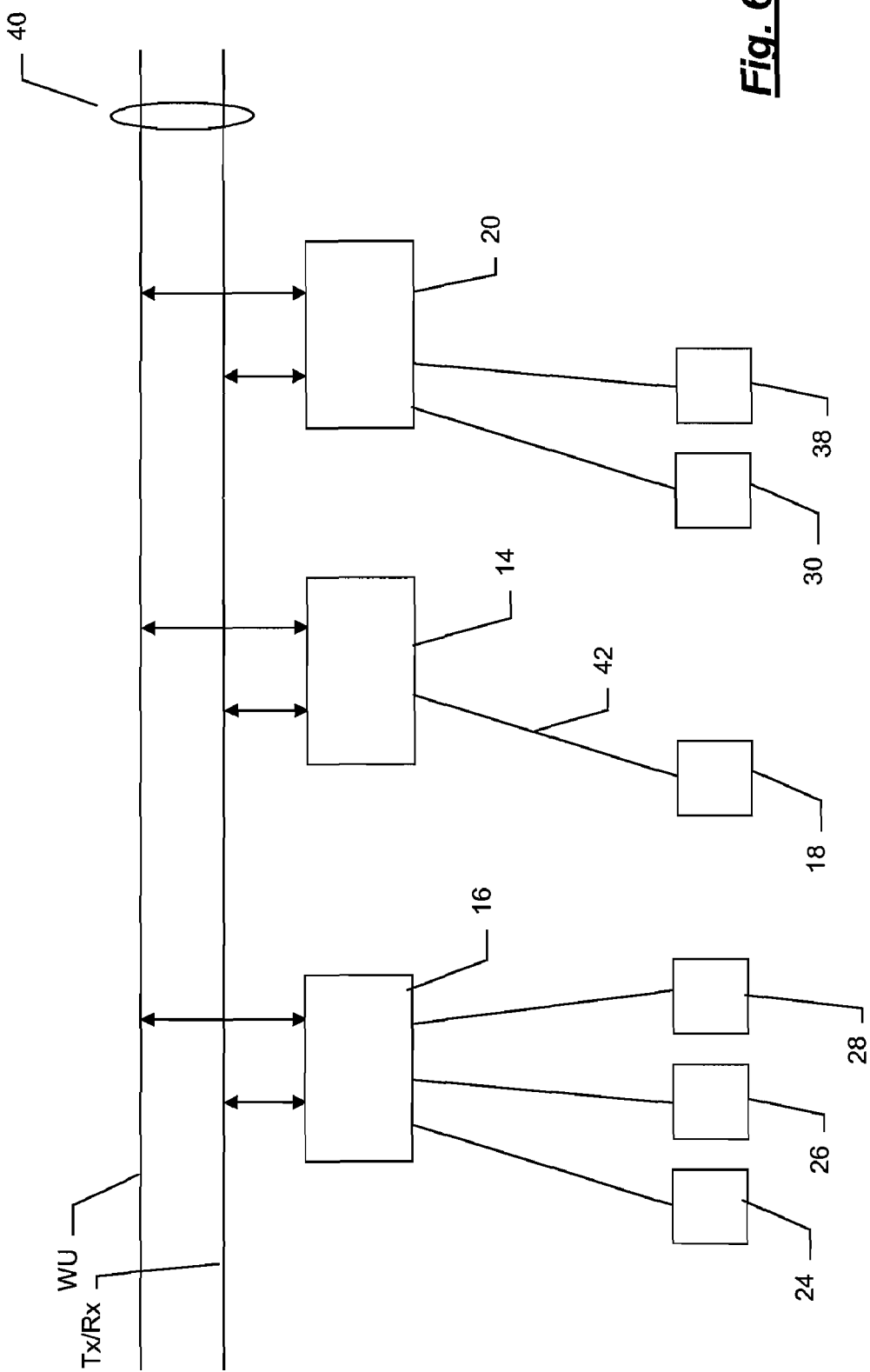
FIG. 6 diagrammatically shows a communication network among the components of the apparatus of FIG. 1.

In the case of a half duplex asynchronous serial communication, with reference to FIG. 6, the data line 40 (from FIG. 1) in practice comprises two common signal lines "Tx/Rx" and "WU", to which the components 14, 16, 20 of the electronics of the on-board electronic apparatus 10 are individually connected to form a communication network.

The signal line Tx/Rx is a receiver/transmitter line for a bi-directional transmission of the data among the various components 14, 16, 20, while the signal line WU is a status line with two values used for the communication protocol. For example, the logic value "0" of the status line WU indicates that the transmission line Tx/Rx is busy, and the logic value "1" of the status line WU indicates that the transmission line Tx/Rx is available for a communication process.

When one of the components, or sender, has something to transmit to another of the components, or receiver, it checks whether the transmission line Tx/Rx is busy or available by reading the value of the status line WU. If the value of the line WU indicates that the transmission line Tx/Rx is busy (WU=0), the sender waits until the value of the line WU indicates that the line Tx/Rx has become available (WU=1). As soon as the transmission line Tx/Rx is available, the sender switches the status of the status line WU, bringing it to "0" to occupy the communication network.

The sender then transmits a packet of serial data onto the transmission line Tx/Rx, in particular a string S1 as described above with reference to FIG. 3.

In the data packet or string S1, the header bytes more specifically comprise the indication of the instructions that must be carried out by the receiver, such information being defined in terms of a code that also encodes the receiver itself, as well as the address of the sender.

There can also be transmission check data, for example checksum or parity bit/s.

The data bytes depend, in length, structure and content, upon what component is sender, upon what component is receiver, and upon the type of information that is transmitted. In the case of transmission of data relative to the battery power supply unit 12 from the processor 14 (block 109 of FIG. 2) to the driving device 20 of the display device 22 (block 201 of FIG. 4), as described above the data bytes comprise the current values of the temperature of the battery Tb, of the voltage of the battery Vb, and of the remaining charge Cres, as well as the absent/present battery data status flag Bass.

When the status line WU is brought to "0" by the sender, all of the electronic components 14, 16, 20 connected in the network start to read the packet of serial data sent by the sender along the transmission line Tx/Rx. The component that recognizes to be the receiver of the transmission, through the decoding of the header bytes of the data packet, becomes the receiver and answers by transmitting onto the transmission line Tx/Rx a packet of serial data indicative of an acknowledgement of receipt intended for the current sender. The other electronic components 14, 16, 20 connected in the network, except for the sender and the receiver, are not involved in the transmission process and can perform other activities.

At the end of the transmission from the receiver to the sender, the sender brings the status line WU to "1" thus releasing the communication network. In case none of the electronic components 14, 16, 20 connected in the network replies to the sender, for example in the case of malfunction of the receiver, the sender releases the network after a predetermined time (time out), bringing the status line WU to "1".

The described half duplex asynchronous serial communication is a "random access multi-master communication system," wherein the exclusive use of the network is carried out by the first "sender" component that requires the network.

If plural components simultaneously require the use of the network, the exclusive use of the network is hierarchically established through a priority defined by the firmware of the various components.

This occurs, for example, when two or more components have something to transmit while the network is busy (status line WU="0") so that they must wait until the network becomes available again. At the moment when the network becomes available again (the status line WU is brought to "1"), the two or more components are all ready to occupy the network, and only the component highest up in the hierarchy becomes the sender.

As an alternative to the half duplex asynchronous serial communication described above, it is possible to establish between the components of the electronics 14, 16, 20 a synchronous serial communication, duplex asynchronous serial communication, CAN, Ethernet or similar, through the data line 40 or other suitable physical network.

Figure 7:
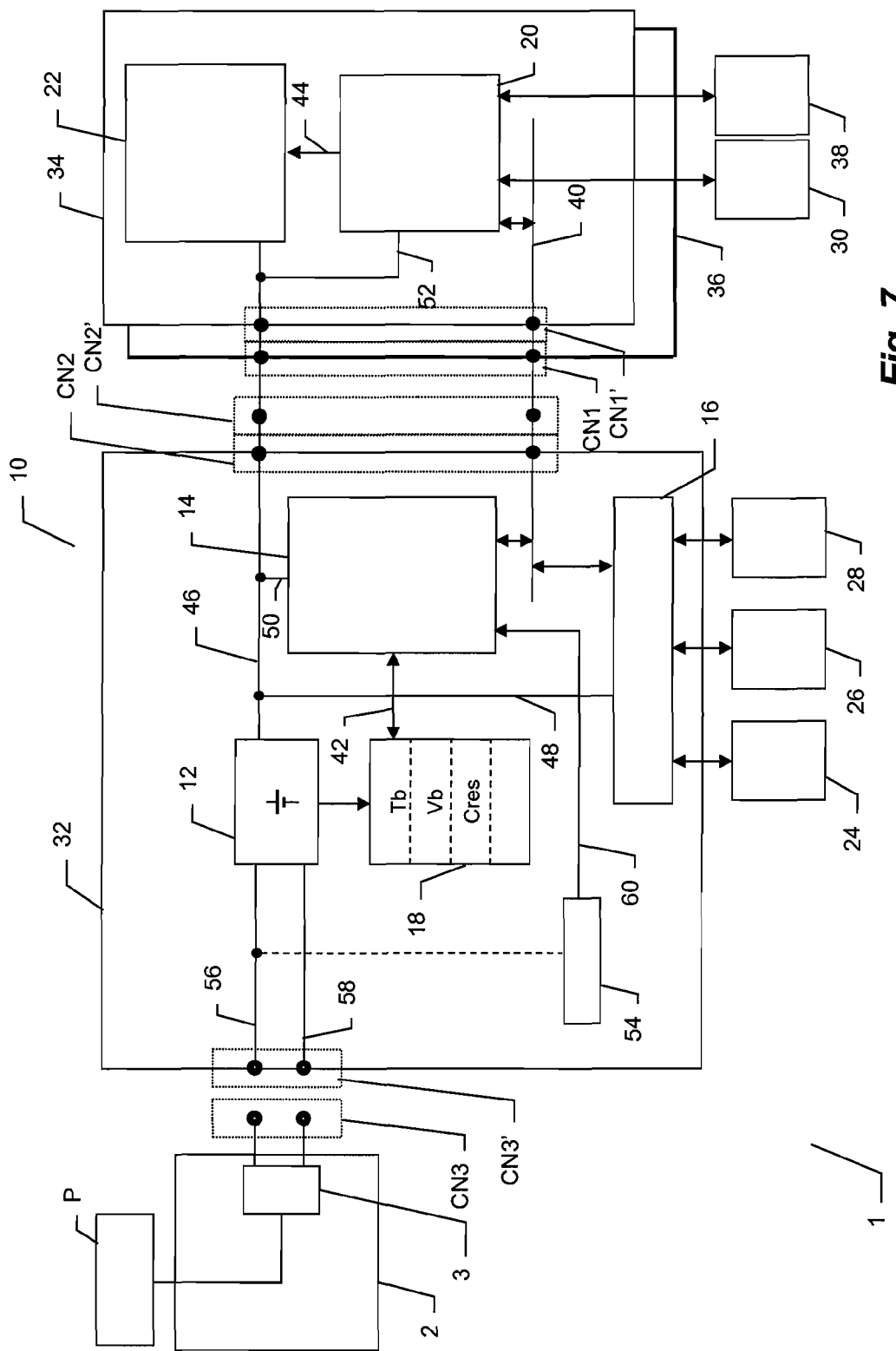
FIG. 7 diagrammatically shows an electronic system for a bicycle according to another embodiment.

In FIG. 7 an electronic system 1 for a bicycle is diagrammatically shown.

The electronic system 1 comprises an on-board electronic apparatus 10 and a battery-charger 2.

The on-board electronic apparatus 10 differs from the one described above (generally shown in FIG. 1) only in that the terminals of the battery power supply unit 12, of the rechargeable type, can further be connected with the battery-charger 2, preferably in a removable manner through a pair of connectors CN3, CN3'. A sensor 54 of the presence of the battery-charger 2 can also be provided, for example a resistive divider that detects the voltage at one of the recharging cables 56, 58 of the battery power supply unit 12 and provides the presence information to the processor 14 through a data line 60.

The battery-charger 2, which can be connected with an external source P such as the electrical mains, comprises a recharging circuit 3 of a known type, for example of the linear type or of the switching type, suitable for recharging the rechargeable battery power supply unit 12 to which the battery-charger 2 is connected. If the battery power supply unit 12 comprises plural rechargeable battery elements, it is possible to provide for the use of plural recharging circuits 3 that can be connected according to suitable configurations to the battery elements to be recharged, for example as described in EP 1 557 926 A1, incorporated by reference as if fully set forth.

When the connection between the battery-charger 2 and the battery power supply unit 12 is removable, as shown in FIG. 7, the battery-charger 2 is housed in a dedicated casing. Alternatively, the battery-charger 2 can be housed in the same casing where the battery power supply unit 12 is housed, for example in the casing 32, and therefore be on-board of the bicycle.

The operation of the electronic system for a bicycle of FIG. 7 is similar to what has been described above with reference to the on-board electronic apparatus 10, but it also takes the recharge status of the battery power supply unit 12 into account.

Figure 8:
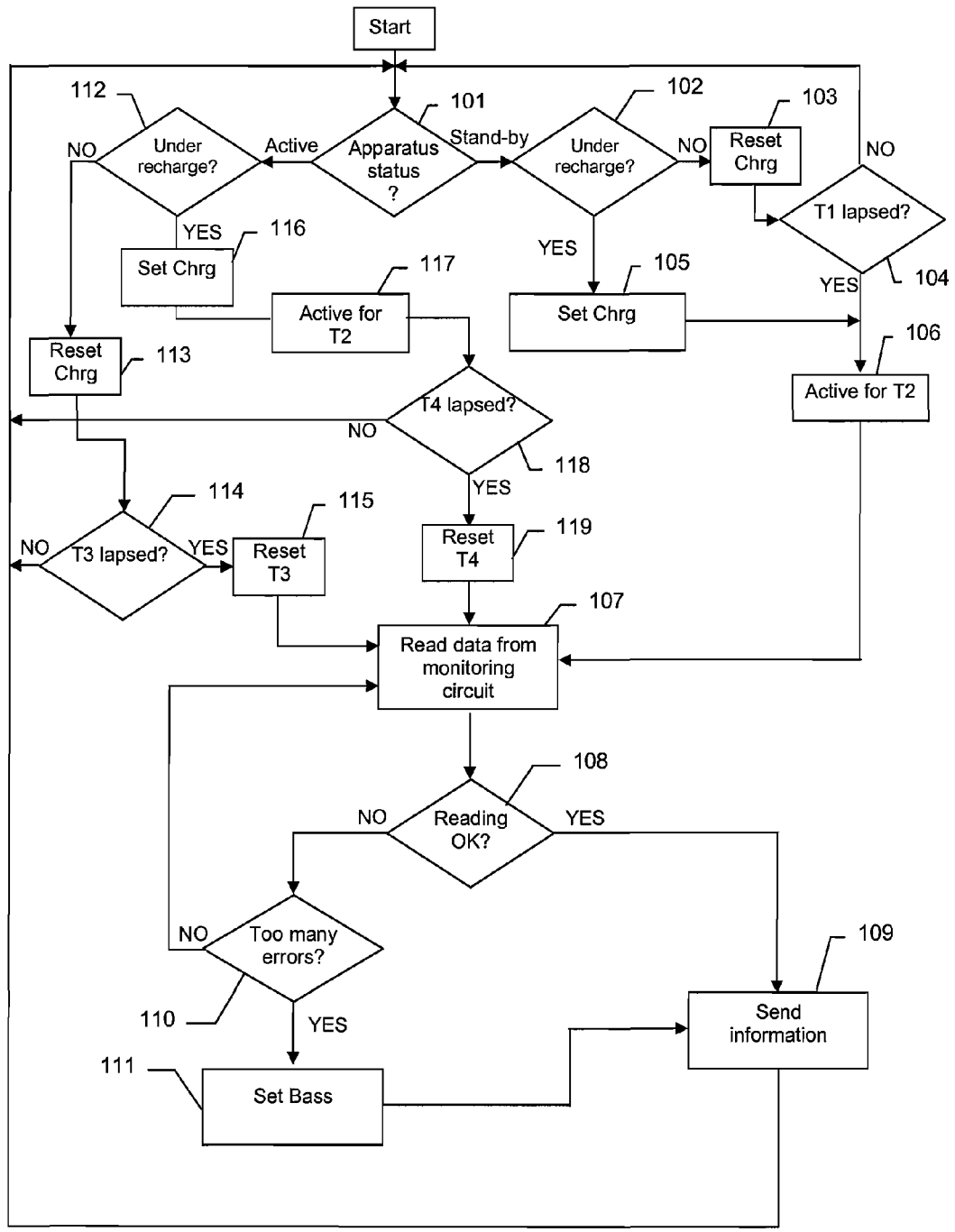
FIG. 8 shows a flow chart relative to the management of a component of the electronic apparatus of FIG. 7.

The flow chart of FIG. 8, relative to the processor 14 connected with the monitoring device 18, shall therefore be described only as far as it differs from the flow chart of FIG. 2.

If from the check of block 101 it is found that the on-board electronic apparatus 10 is in the stand-by condition, in a block 102 it is checked whether the battery power supply unit 12 is connected with the battery-charger 2, based upon the information received from the sensor 54 through the data line 60. In the negative case, in a block 103 a status bit or flag Chrg is set to a value indicative thereof, and block 104 of checking the lapse of the first predetermined time period T1 is entered.

If, on the other hand, from the check of block 102 it is found that the battery power supply unit 12 is connected with the battery-charger 2, in a block 105 the status bit or flag Chrg is set at a value indicative thereof, and block 106 of activation of the on-board electronic apparatus 10 for the second predetermined time period T2 is directly entered.

The check of block 102 is necessary since the battery power supply unit 12 can be connected with the battery-charger 2 from a stand-by condition. Once recharging has begun, the on-board electronic apparatus 10, on the other hand, remains in the active condition in which it is brought in block 106.

If, on the other hand, from the check of block 101 it is found that the on-board electronic apparatus 10 is in the active condition, in a block 112 it is checked whether the battery power supply unit 12 is—initially or still—connected with the battery-charger 2, based upon the information received by the sensor 54 through the data line 60. In the negative case, in a block 113 the status bit or flag Chrg is set to a value indicative thereof, and block 114 of checking the lapse of the third predetermined time period T3 is directly entered.

If, on the other hand, from the check of block 112 it is found that the battery power supply unit 12 is connected with the battery-charger 2, in a block 116 the status bit or flag Chrg is set to a value indicative thereof, and a block 117 is directly entered, of activation of the on-board electronic apparatus 10 for the same second predetermined time period T2 as block 106, sufficient to send the data relative to the battery power supply unit 12 to the driving device 20 of the display device 22. In practice, through block 117 it is also accomplished that the on-board electronic apparatus 10 is always in active state when the battery power supply unit 12 is being charged.

Then, in a block 118 the lapse of a fourth predetermined time period T4 is checked.

If such a fourth time period T4 has not lapsed, starting block 101 is returned to. If, on the other hand, the fourth time period T4 has lapsed, in a block 119 the fourth time period T4 is reset, and then block 107 of reading the data Tb, Vb and Cres relative to the battery power supply unit 12 is entered.

Similarly to the third time period T3 monitored in block 114, the fourth time period T4 is selected of suitable length between the opposing requirements of having data Tb, Vb and Cres that are as up-to-date as possible on the one hand, and of not busying too much the data lines 40, 42 on the other. A suitable value for the fourth time period T4 is for example 20 seconds.

In an alternative embodiment, blocks 118 and 119 could be absent, the flow passing from block 117 to block 114. Indeed, the meaning of both time periods T3 and T4 is to set a suitable refresh time for detecting the data relative to the battery power supply unit 12.

Figure 9:
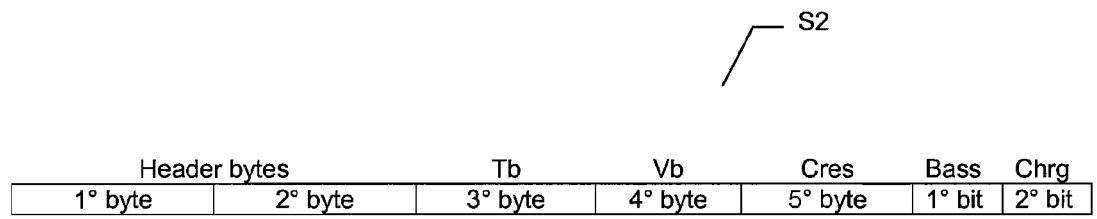
FIG. 9 shows an embodiment of a data structure used by the electronic system of FIG. 7.

The flag Chrg indicative of the recharging of the battery power supply unit 12 through the battery-charger 2 is sent to the driving device 20 of the display device 22. The data packet transmitted, in the ways outlined above, along the data line 40 is therefore modified in a string S2, shown in FIG. 9, which differs from the string S1 in the addition of a bit indicative of the flag Chrg.

Figure 10:
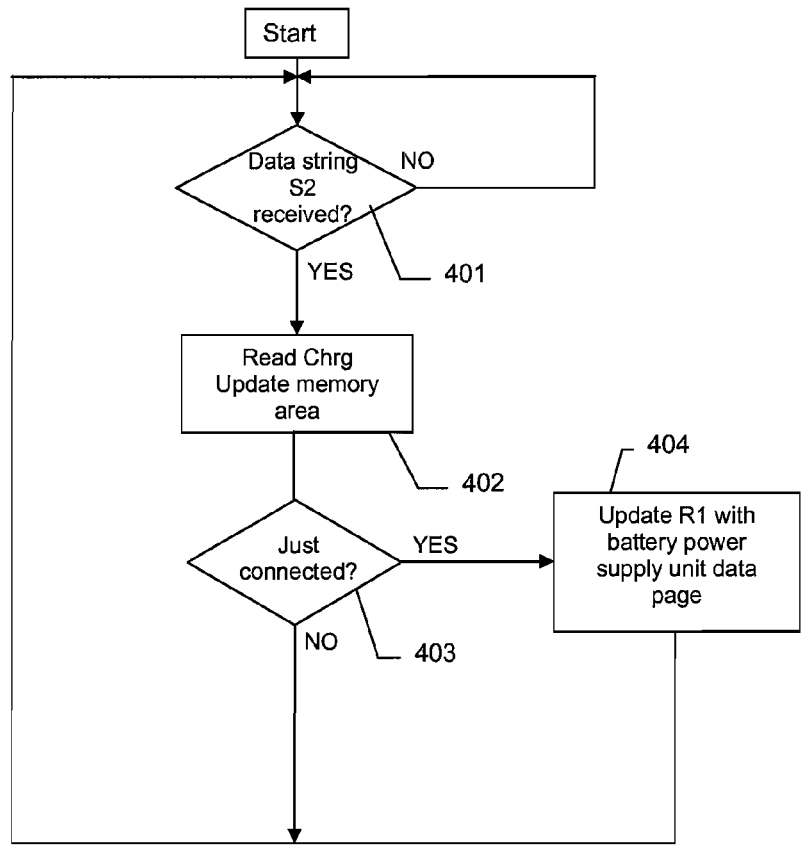
FIG. 10 shows a flow chart relative to the management of another component of the electronic apparatus of FIG. 7.

In the driving device 20 of the display device 22 a routine totally corresponding to the one shown in FIG. 5, and a routine, shown in FIG. 10, modified with respect to the one shown in FIG. 4, are carried out.

The driving device 20 checks in block 401 whether it has received data relative to the battery power supply device 12 through the data line 40, in particular whether it has received the data string S2. Checking block 401 continues to be executed until a positive outcome. In case of a positive outcome, in block 402 the driving device 20 reads from the suitable memory area the current value of the status flag Chrg, and then it updates the temperature Tb, voltage Vb and remaining charge Cres data, the status flag Bass and the status flag Chrg.

In a block 403, the driving device 20 of the display device 22 checks whether the temperature Tb, voltage Vb and remaining charge Cres data received in block 401 is the data that immediately follows the connection of the battery power supply unit 12 to the battery-charger 2, or the connection of the battery-charger 2 to the external power source P, through a comparison of the value of the status bit Chrg received in the string S2 and its previous value in the memory area, read in block 402.

In the affirmative case, in a block 404 the driving device 20 of the display device 22 writes in the register R1 of the page to be displayed a value indicative of a page for displaying the data relative to the battery power supply unit 12, and the routine starts over from block 401. In this way, the parallel routine shown in FIG. 5, when it arrives in block 304, forces such a page to be displayed through the reading of the value associated thereto in the register R1.

If, on the other hand, they are not data that immediately follow the connection of the battery power supply unit 12 to the battery-charger 2, or the connection of the battery-charger 2 to the external power source P, block 404 is not executed and the routine starts over immediately from block 401. In this case, therefore, the memory area with the data relative to the battery power supply unit 12 is in any case updated in block 402, but displaying of the updated data is not immediately forced on the display device 22.

In addition to the operating temperature Tb, the nominal voltage value Vb at the terminals, the remaining charge value Cres, the status Bass of present or absent data relative to the battery power supply unit 12, and the status Chrg of battery power supply unit 12 under recharge, the electronic system 1 for a bicycle and in particular the on-board electronic apparatus 10 can display other data relative to the battery power supply unit 12 with an information purpose for the cyclist.

In particular, it is possible to display the remaining autonomy in kilometers km_res (the example herein is in kilometers but it should be understood that any unit of measure could be selected), in hours hh_res or in days gg_res. This data relative to the battery power supply unit 12 can be calculated by the driving device 20 of the display device 22 or by one or more of the other electronic components 14, 16 of the on-board electronic apparatus 10, in the way described with reference to the flow charts of FIGS. 11 and 12. The km_res and gg_res data or other service parameters used for their calculation are transmitted to the driving device 20 of the display device 22 along the data line 40 for example with the mode of communication described above.

A start block 501 corresponds to the first power supply of the electronic apparatus 10 for a bicycle, for example after the replacement of the battery power supply unit 12.

In an initialization block 502, a variable Chr_prec is set with the current value of the remaining charge Cres, and a variable T indicative of the travel time, a variable Dst indicative of the traveled distance, and a variable Chr_integr indicative of the charge consumption of the battery power supply unit 12 are zeroed.

Then a cycle described in detail hereinafter is repeated.

In a block 503, it is checked whether the value of the variable Chr_prec is greater than the remaining charge Cres. A positive outcome of the check is indicative of the fact that the battery power supply unit 12 is discharging, and therefore in a block 504 the variable Chr_integr is updated adding the consumed charge with respect to the previous update, namely the difference between the previous remaining charge Chrg_prec and the current remaining charge Cres, to its current value:

$$Chr\_integr := Chr\_integr + Chr\_prec - Cres$$

In a block 505, the variable Chr_prec is then updated with the current remaining charge value Cres:

$$Chr\_prec := Cres$$

In a subsequent block 506, it is checked whether the value of the variable Chr_prec is less than the remaining charge Cres. A positive outcome of the check is indicative of the fact that the remaining charge is increasing and therefore that the battery power supply unit 12 is under recharge, and therefore in a block 507 the variable Chr_prec is updated with the current remaining charge value Cres. It should be understood that in the case of just the on-board electronic apparatus 10 without battery-charger 2, blocks 506 and 507 can be left out since the comparison of block 506 would always give a negative outcome and block 507 would never be executed.

In a subsequent block 508, it is checked whether the bicycle is moving, checking whether the current speed V_ist detected by a speed sensor (one of the peripheral devices 24, 26, 28) is different from zero.

In the affirmative case, in a block 509 the variable Dst indicative of the traveled distance and the variable T indicative of the travel time are updated to the values of traveled distance and lapsed time with the bicycle in motion since the previous update. The lapsed time is monitored by a clock, while the traveled distance is calculated based upon the lapsed time and the speed, as well as the knowledge of the circumference of the bicycle wheel should the speed be detected in terms of revolutions of the wheel per unit time.

In a subsequent block 510 the current time is compared with a predetermined reference time, for example midnight, a time at which the day on the bicycle can probably be considered to have ended.

If the outcome is negative, to block 503 is returned to.

If, on the other hand, the outcome is positive, in a block 511 it is checked whether the traveled distance Dst is different from zero. In the negative case, i.e. if the day has lapsed without the bicycle having traveled any distance, in a block 512 the variables Chr_integr, Dst and T are zeroed.

If, on the other hand, the outcome of the check of block 511 is positive, before executing block 512 blocks 513, 514, 515 are executed.

In block 513 the current value of the travel time variable T is stored in a table of travel times. The table of travel times has the structure of a circular buffer or FIFO, in which a predetermined number n of values can be stored, for example n=10. The table of travel times is updated by replacing the oldest value with the most recent value.

In block 514, the value of a kilometric consumption variable Cons indicative of the charge change per traveled kilometer is calculated as a ratio between the amount of charge consumed during the day (or other time period, for convenience, days are discussed herein), represented by the variable Chr_integr, and the traveled distance during the day Dst:

$$Cons := Chr\_integr / Dst$$

The kilometric consumption value thus calculated is stored in a kilometric consumptions table. The kilometric consumptions table also has the structure of a circular buffer or FIFO, in which a number n of values can be stored and that is updated by replacing the oldest value with the most recent value.

Finally, in block 515, the value of a daily average speed variable V, expressed in Km/h, is calculated as a ratio between the traveled distance Dst and the travel time T updated by the various executions of block 509:

$$V := Dst / T$$

The daily average speed value V, in Km/h, thus calculated is stored in a daily speeds table. The daily speeds table also has the structure of a circular buffer or FIFO, in which a number n of values can be stored and that is updated by replacing the oldest value with the most recent value.

The numbers of elements stored in the three tables described above do not necessarily have to be the same.

Figure 12:
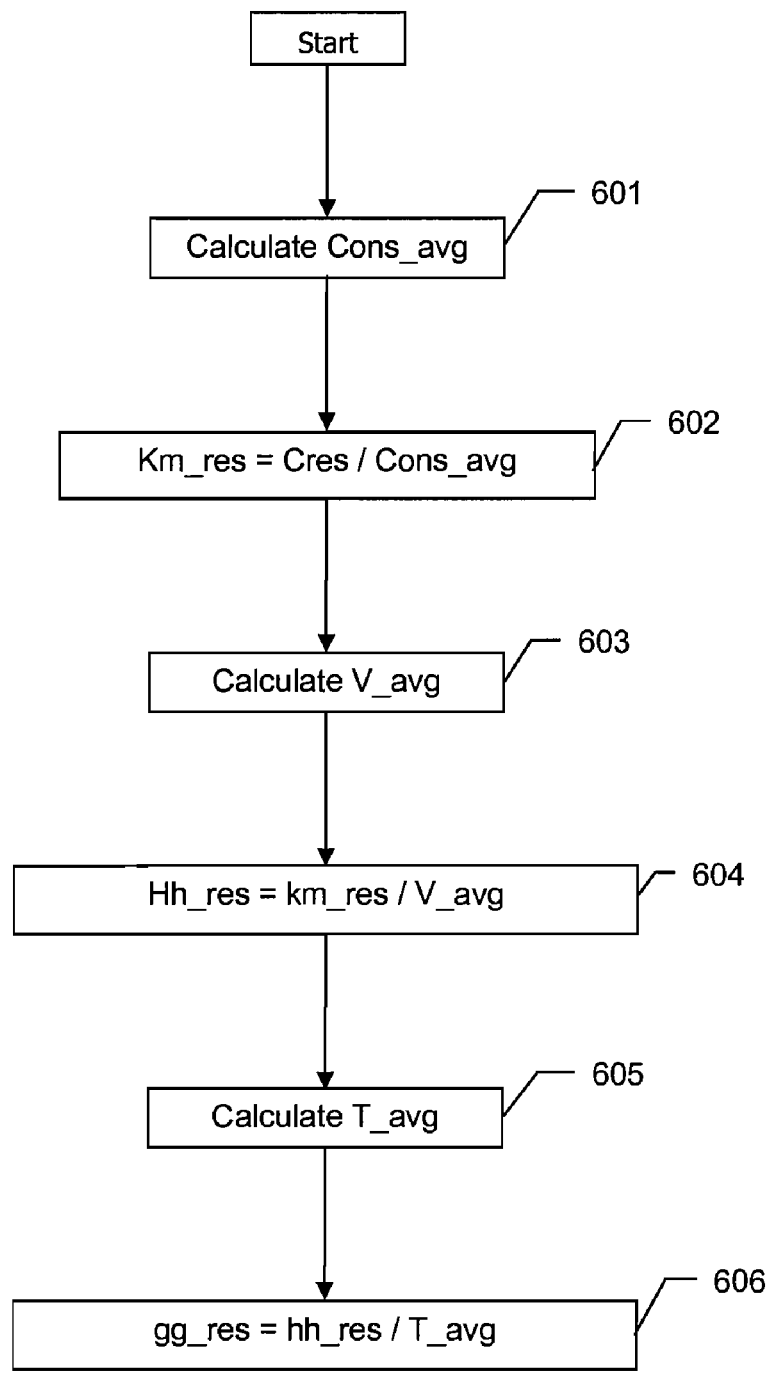

With reference to the flow chart of FIG. 12, to display the remaining autonomy, in a block 601 a daily average consumption Cons_avg is calculated as the arithmetic average of the n values of the kilometric consumption table. In a block 602 the remaining autonomy in kilometers km_res is calculated as a ratio between the remaining charge value and the daily average consumption Cons_avg:

$$km\_res = Cres / Cons\_avg$$

In a block 603 a daily average speed V_avg is calculated as the arithmetic average of the n values of the daily speeds table. In a block 604 the remaining autonomy in hours hh_res is calculated as a ratio between the remaining autonomy in kilometers km_res and the daily average speed V_avg:

$$hh\_res = km\_res/V\_avg$$

In a block 605 a daily average time T_avg is calculated as the arithmetic average of the n values of the table of travel times. In a block 606 the remaining autonomy in days gg_res is calculated as a ratio between the remaining autonomy in hours hh_res and the daily average time T_avg:

$$gg\_res = hh\_res/T\_avg$$

It should be understood that the travel times, kilometric consumptions and daily speeds tables can be omitted, the remaining autonomy being calculated on the current values of the travel time T, kilometric consumption Cons and daily average speed V variables.

Figure 11:
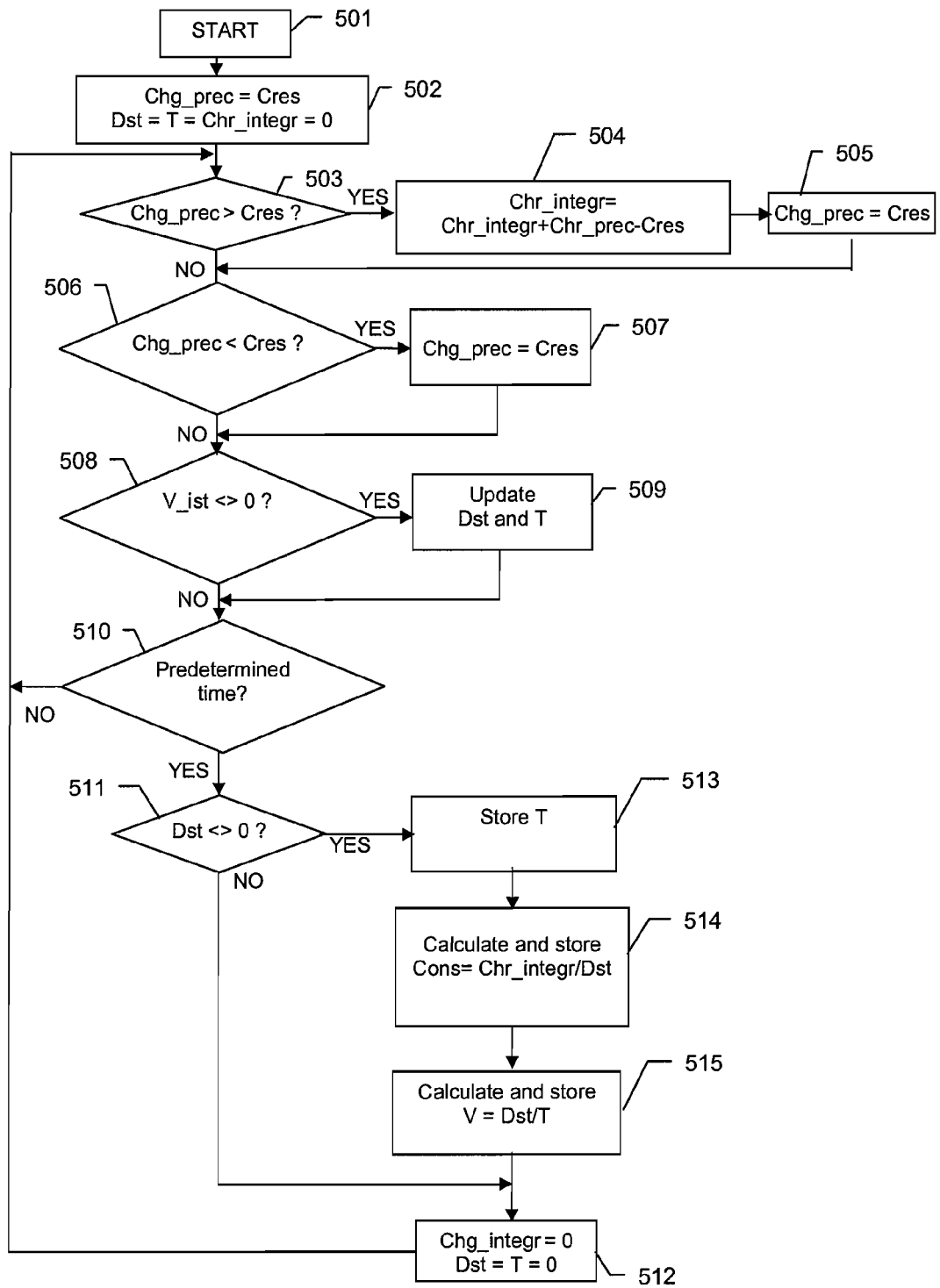
FIGS. 11 and 12 show flow charts relative to a display method.

It should also be understood that should one wish to only display the remaining autonomy in kilometers or in hours, the daily average time variable T_avg is not necessary and blocks 513 of the flow chart of FIG. 11 and 605-606 of the flow chart of FIG. 12 are omitted.

Should one wish to only display the remaining autonomy in kilometers, the time T and daily speed V variables are not necessary and blocks 513 and 515 of the flow chart of FIG. 11 and blocks 603-606 of the flow chart of FIG. 12 are omitted.

In the electronic system 1 for a bicycle of FIG. 7, the monitoring circuit 18 of the battery power supply unit 12 can also be housed in the battery-charger 2, should one wish to display the data relative to the battery power supply unit 12 only during recharge thereof. Displaying in any case occurs on the display device 22 of the on-board electronic apparatus 10, so that the battery-charger 2 is not provided with its own display device.

Figure 13:
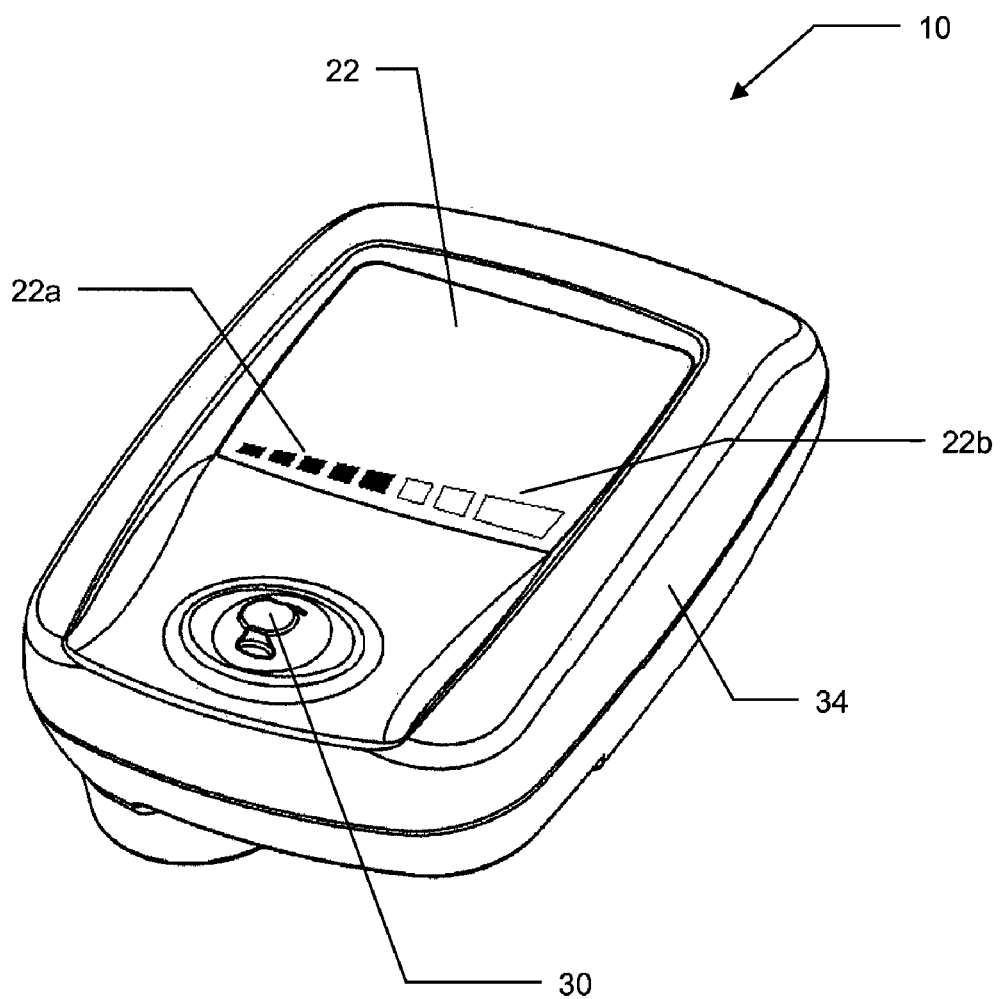
FIG. 13 shows a perspective view of an on-board electronic apparatus for a bicycle according to an embodiment of the invention.

In FIG. 13, an on-board electronic apparatus 10 is shown. On its display device 22, the remaining charge value Cres of the battery power supply unit 12 is displayed as a proportional number of solid segments 22a of a remaining charge scale. A number of empty segments 22b of the remaining charge scale is also shown, but they can also be omitted. During recharging of the battery power supply unit 12, the number of solid segments 22a thus increases. A joystick 30 is shown as manual command device 30.

What is claimed is:

1. Electronic system for a bicycle comprising an on-board electronic apparatus, comprising a display device, a battery power supply unit, and electronics for obtaining at least one datum relative to the battery power supply unit and for displaying the at least one datum on the display device, and a battery-charger, wherein the battery-charger has no display unit.

2. The system according to claim 1, wherein the electronics comprises a plurality of components connected in a network for data communication.

3. The system according to claim 2, wherein the components communicate through a half duplex asynchronous serial communication protocol through a data line.

4. The system according to claim 1, wherein the battery power supply unit is of the rechargeable type.

5. The system according to claim 1, wherein the battery-charger is removably associable with the on-board electronic apparatus.

6. The system according to claim 1 wherein the at least one datum is a remaining charge.

7. The system according to claim 1 wherein the at least one datum is a distance remaining related to current battery supply unit usage.

8. The system according to claim 1 wherein the at least one datum is a time duration remaining related to current battery supply unit usage.

9. The system according to claim 1 wherein the at least one datum related to the battery supply unit can be displayed on the display unit during operation of the cycle.

10. The system according to claim 9, wherein displaying the at least one datum related to the battery supply unit is optional, and the displaying of the datum is controlled by a user.

11. Method for managing an on-board electronic apparatus for a bicycle comprising a display device and a battery power supply unit, comprising the steps of obtaining at least one datum relative to the battery power supply unit, and displaying the at least one datum on the display device, wherein the step of obtaining at least one datum relative to the battery power supply unit is carried out at predetermined recurrence when the on-board electronic apparatus is in an active condition.

12. The method according to claim 11, wherein the at least one datum relative to the battery power supply unit is selected from the group consisting of a temperature, a voltage at the terminals, a remaining charge, an alarm state, a recharge state and a remaining autonomy of the battery power supply unit.

13. The method according to claim 11, further comprising the step of displaying information other than the at least one datum relative to the battery power supply unit on the display device.

14. The method according to claim 13, further comprising a step of manually selecting the information to be displayed.

15. The method according to claim 14, wherein the at least one datum relative to the battery power supply unit comprises an alarm state or a recharge state of the battery power supply unit, and wherein the method comprises a step of forcing the display of the at least one datum relative to the battery power supply unit.

16. The method according to claim 11, comprising the steps of:
   obtaining a charge consumption of the battery power supply unit per unit traveled distance,
   detecting a remaining charge of the battery power supply unit,
   calculating an available remaining distance as a ratio between the remaining charge and the charge consumption per unit traveled distance, and
   displaying the available remaining distance.

17. The method according to claim 16, wherein the step of obtaining a charge consumption per unit traveled distance comprises the steps of:
   obtaining a consumed charge,
   obtaining a traveled distance,
   calculating the charge consumption per unit traveled distance as a ratio between the consumed charge and the traveled distance.

18. The method according to claim 16, further comprising the steps of:
   obtaining an average speed,
   calculating an available remaining time as a ratio between the available remaining distance and the average speed, and
   displaying the available remaining time.

19. The method according to claim 18, further comprising the steps of:
   detecting a travel time,
   calculating remaining days as a ratio between the available remaining time and the travel time, and
   displaying the remaining days.

20. The method according to claim 18, wherein the charge consumption per unit traveled distance, average speed and/or travel time are daily averages.

21. The method according to claim 18, wherein the charge consumption per unit traveled distance, average speed and/or travel time are values averaged over a predetermined number of days.

22. The method according to claim 11, further comprising the step of recharging the battery supply unit.

23. Method for managing an on-board electronic apparatus for a bicycle comprising a display device and a battery power supply unit, comprising the steps of obtaining at least one datum relative to the battery power supply unit, displaying the at least one datum on the display device, and recharging the battery power supply unit, wherein the step of obtaining at least one datum is carried out at least in part during the recharging step.

24. Method for managing an on-board electronic apparatus for a bicycle comprising a display device and a battery power supply unit, comprising the steps of obtaining at least one datum relative to the battery power supply unit, and displaying the at least one datum on the display device, wherein the step of obtaining at least one datum relative to the battery power supply unit is carried out at predetermined recurrence when the on-board electronic apparatus is in a stand-by condition.

* * * * *